US012686810B2

(12) United States Patent
Estrada Benavides

(10) Patent No.: US 12,686,810 B2
(45) Date of Patent: Jul. 21, 2026

(54) CORROSION INHIBITOR COMPOSITIONS FOR REDUCING CORROSION, AND RELATED METHODS OF OPERATING A WELLBORE

(71) Applicant: Schlumberger Technology Corporation, Sugar Land, TX (US)

(72) Inventor: Juan David Estrada Benavides, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/272,821

(22) Filed: Jul. 17, 2025

(65) Prior Publication Data

US 2026/0022289 A1 Jan. 22, 2026

Related U.S. Application Data

(60) Provisional application No. 63/672,559, filed on Jul. 17, 2024.

(51) Int. Cl.

| | |
|---|---|
| ***C09K 8/74*** | (2006.01) |
| ***C09K 8/54*** | (2006.01) |
| ***E21B 41/02*** | (2006.01) |
| ***E21B 43/267*** | (2006.01) |

(52) U.S. Cl.
CPC .................. *C09K 8/74* (2013.01); *C09K 8/54* (2013.01); *E21B 41/02* (2013.01); *E21B 43/267* (2013.01); *C09K 2208/32* (2013.01)

(58) Field of Classification Search
CPC ........ C09K 8/80; C09K 2208/08; C09K 8/62; C09K 8/88; C09K 8/52; C09K 8/74; C09K 2208/32; E21B 41/02; E21B 43/267; E21B 43/26; E21B 37/06
See application file for complete search history.

(56) References Cited

U.S. PATENT DOCUMENTS

| | | | | |
|---|---|---|---|---|
| 5,096,618 | A * | 3/1992 | Frenier | C23F 11/10 507/263 |
| 11,591,511 | B2 | 2/2023 | Purdy | |
| 11,795,379 | B2 | 10/2023 | Purdy | |
| 12,018,210 | B2 | 6/2024 | Purdy | |
| 2023/0125900 | A1 | 4/2023 | Purdy | |
| 2024/0191128 | A1 | 6/2024 | Purdy | |
| 2025/0075595 | A1 | 3/2025 | Rabie | |

FOREIGN PATENT DOCUMENTS

| | | | | |
|---|---|---|---|---|
| CA | 2656344 A1 * | 8/2009 | | C09K 8/54 |
| CN | 106433607 A | 2/2017 | | |
| EP | 0278543 B1 | 9/1992 | | |
| EP | 3071666 B1 * | 8/2020 | | E21B 43/267 |

* cited by examiner

*Primary Examiner* — Zakiya W Bates
(74) *Attorney, Agent, or Firm* — Jeffrey D. Frantz

(57) ABSTRACT

A method of removing a calcareous material from sand while processing the sand includes mining sand at a location proximate a wellbore extending into an earth formation, and contacting the sand with an aqueous treatment fluid to remove calcareous materials from the sand and form treated hydraulic fracturing sand, the aqueous treatment fluid including a corrosion inhibitor composition. The corrosion inhibitor composition includes an alkenylphenone, and a substituted 1-azanapthalene.

20 Claims, 4 Drawing Sheets

CORROSION INHIBITOR COMPOSITIONS FOR REDUCING CORROSION, AND RELATED METHODS OF OPERATING A WELLBORE

CROSS REFERENCE TO RELATED APPLICATIONS

This application claims benefit of U.S. Provisional Patent Application No. 63/672,559, filed on Jul. 17, 2024.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

After drilling a wellbore through an earth formation, the wellbore is completed to connect hydrocarbon reservoirs within the earth formation to the surface to facilitate fluids to be produced from or injected into the wellbore and earth formation. For example, wellbore completion includes providing a conduit for well stimulation treatments, such as acidizing and perforating. Perforation of the wellbore creates perforation tunnels, which facilitate fracturing of the earth formation to create fractures through which formation fluids may be produced. After perforation, a hydraulic fracturing fluid may be provided to the wellbore to create fractures in the rock formation of the earth formation.

Hydraulic fracturing involves introducing (e.g., injecting) a fracturing fluid into the earth formation, the fracturing fluid including water and proppant, such as fracturing sand. The fracturing fluid is provided to the earth formation at pressures exceeding the fracture point of the rocks defining the earth formation to generate fractures in the rocks. The fracturing fluid may penetrate into the earth formation through the fractures under the pressure of the fracturing fluid. When the pressure of the fracturing fluid is released, the sand remains in the fractures and props the fractures open.

Fracturing sand has traditionally been produced at mines having a known composition and type of sand that is suitable for fracturing. However, the cost of delivered fracturing sand may be significantly more than the cost of the fracturing sand product due to the transportation costs associated with delivery of the fracturing sand from the mine or processing plant to a wellsite. To reduce the transportation costs of the fracturing sand it is desired to obtain the fracturing sand at a location proximate the wellsite where it will be used. Unfortunately, the qualify of the sand proximate the wellsite may not be the same as the quality of sand from known sand mines.

BRIEF SUMMARY

In some embodiments, a method includes mining sand at a location proximate a wellbore extending into an earth formation, and contacting the sand with an aqueous treatment fluid to remove calcareous materials from the sand and form treated hydraulic fracturing sand, the aqueous treatment fluid including a corrosion inhibitor composition. The corrosion inhibitor composition comprises an alkenylphenone, and a substituted 1-azanapthalene.

In some embodiments, a method for inhibiting corrosion of sand processing equipment during processing of hydraulic fracturing sand includes contacting sand including a calcareous material with a treatment fluid to dissolve the calcareous material from the sand. The treatment fluid includes an acid and a corrosion inhibitor composition. The corrosion inhibitor composition includes an alkenylphenone with the structure:

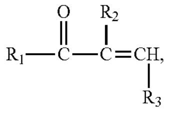

wherein $R_1$ is an unsubstituted or an inertly substituted aryl having 6 carbon atoms to 10 carbon atoms, and $R_2$ and $R_3$ each individually include hydrogen, a halogen, or an inertly substituted aliphatic having 3 carbon atoms to 12 carbon atoms, an unsubstituted or inertly substituted aryl having 6 carbon atoms to 10 carbon atoms, wherein a total number of carbon atoms of the alkenylphenone is less than 16. The corrosion inhibitor composition further includes a substituted 1-azanaphtalene with the structure

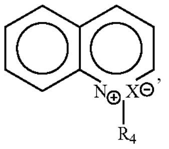

wherein $R_4$ is a substituted alkyl having 4 carbon atoms to 16 carbon atoms, or an unsubstituted or inertly substituted alkylaryl having 7 carbon atoms to 20 carbon atoms, and X is a halide.

In some embodiments, a method for removing a calcareous material from hydraulic fracturing sand includes mining sand from an earth formation including the sand and a calcareous material, and contacting the sand with a treatment fluid including an acid and a corrosion inhibitor composition. The corrosion inhibitor composition includes an alkenylphenone having the following structure:

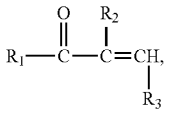

wherein $R_1$ is an unsubstituted or an inertly substituted aryl having 6 carbon atoms to 10 carbon atoms, and $R_2$ and $R_3$ each individually include hydrogen, a halogen, or an inertly substituted aliphatic having 3 carbon atoms to 12 carbon atoms, an unsubstituted or inertly substituted aryl having 6 carbon atoms to 10 carbon atoms, wherein a total number of carbon atoms of the alkenylphenone is less than 16, and a substituted 1-azanaphtalene having the following structure:

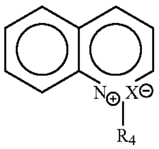

wherein $R_4$ is a substituted alkyl having 4 carbon atoms to 16 carbon atoms, or an unsubstituted or inertly substituted alkylaryl having 7 carbon atoms to 20 carbon atoms, and X is a halide, and a surfactant including a quaternary ammonium salt, wherein the corrosion inhibitor composition includes at least about 3.0 parts by weight of the substituted 1-azanaphtalene for every about 1.0 part by weight of the alkenylphenone.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
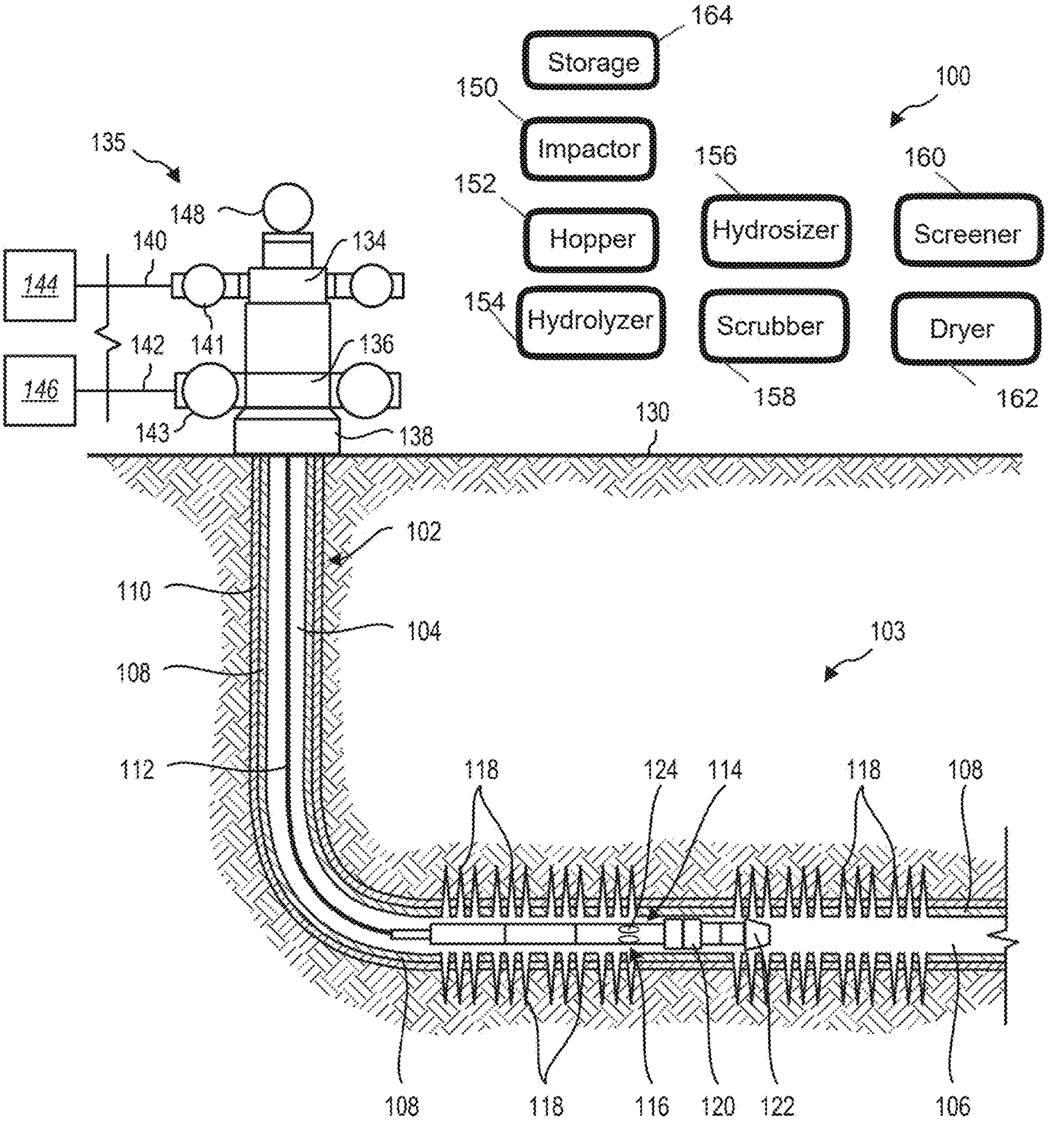
FIG. 1 is a representation of a perforation system for forming perforations in a wellbore and earth formation through which the wellbore extends, according to at least one embodiment of the present disclosure.

This disclosure generally relates to methods of treating fracturing sand materials at a sand mine or a sand processing facility. Fracturing sand may be mined from a sand mine and processed at the sand mine and/or a sand processing facility. The sand may include minerals such as quartz, feldspars (e.g., potassium feldspar, albite, anorthite, orthoclase, sanidine, microcline, anorthoclase), micas (e.g., muscovite, paragonite, margarite, biotite, lepidolite, phlogopite), rutile, ilmenite, zircon, and monazite, among others. In addition, some sands may include calcareous (carbonate) materials, such as limestone or other calcium and/or magnesium-containing materials.

Some of the minerals that are present in the sand be detrimental to hydrocarbon production when sands containing such minerals are used in fracturing fluids. Responsive to exposure to various wellbore fluids (e.g., acids, brines, water), some of the minerals may dissolve. As one example, calcareous materials (e.g., calcium carbonate) present in the sand may dissolve in fracturing fluids or other wellbore fluids. The dissolved minerals and/or carbonate materials may subsequently precipitate and cause scaling in the earth formation, the wellbore, or on wellbore equipment. Scaling caused by the minerals and/or calcareous materials may cause issues, such as issues with wellbore equipment or reduction in the conductivity of the earth formation and/or wellbore, reducing the recovery of hydrocarbons from hydrocarbon-containing zones of the earth formation.

According to embodiments described herein, sand may be treated with a treatment fluid to remove one or more undesired minerals (e.g., calcium carbonate) from the sand. For example, in some embodiments, the sand is processed to remove fine particulate materials from the sand. In some embodiments, washing the sand may include washing the sand with water and, optionally, one or more chemicals to remove the impurities from the sand. In some embodiments, the sand is washed with the treatment fluid.

The treatment fluid may include one or more materials formulated and configured to dissolve (e.g., leach) the undesired minerals from the sand. In some embodiments, the treatment fluid includes an acid formulated and configured to dissolve the undesired minerals from the sand. The treatment fluid may include, for example, hydrochloric acid, sulfuric acid, acetic acid, another acid, bleach, or another corrosion material. In some embodiments, the treatment fluid does not substantially interact (e.g., react) with quartz in the sand. Exposing the sand to the treatment fluid may dissolve (e.g., remove) minerals other than quartz from the sand. In some embodiments, the treatment fluid is formulated and configured to remove (e.g., dissolve) calcareous materials (e.g., calcium carbonate) from the sand.

Due to the presence of the acid and/or other corrosive materials in the treatment fluid, the treatment fluid may be corrosive to mining equipment, sand processing equipment, and or sand transportation equipment. In some embodiments, the treatment fluid includes a corrosion inhibitor composition and/or is provided to the sand with a corrosion inhibitor composition. The corrosion inhibitor composition may include a corrosion inhibitor for reducing and/or preventing corrosion to one or more sand mining equipment and/or sand processing equipment, such as one or more of conveyors, pumps, piping, valves, drilling rigs for drilling boreholes into the sand formation, crushers for freeing the sand from large rocks and boulders of sandstone, screening and sizing equipment for screening the sand, equipment for washing and/or desliming the sand (wherein microfine particles are removed from the sand), spiral plants for separating minerals from the sand deposits (e.g., spiral concentrators), gravity separators, electrostatic separators, and magnetic separators, loaders, rail cars, trucks, or other equipment for mining, processing, and/or transporting the sand. The corrosion inhibitor composition may reduce and/or prevent corrosion of, for example, mining equipment, sand processing equipment, and/or sand transportation equipment.

The corrosion inhibitor composition may be formulated and configured to form a protective layer on components associated with mining, processing, and/or transporting the sand. The corrosion inhibitor composition reduces and/or prevent corrosion of components including one or more of zinc, copper, aluminum, nickel, chromium, another metal, alloys thereof, or a combination thereof.

Accordingly, various embodiments of the present disclosure provide techniques for treating a sand material with a treatment fluid and minimizing the corrosion of a component that contains one or more types of metals and/or metallic alloys. In particular, the techniques provide a fluid system that includes a corrosion inhibitor composition for inhibiting or minimizing the corrosion of such components. For example, the component may include zinc, nickel, copper, chromium, aluminum, iron, one or more alloys thereof, or a combination thereof.

In certain embodiments, the corrosion inhibitor is used in an acidic solution for protecting wireline tools during spearhead acid operations. In certain embodiments, the composition of the corrosion inhibitor may include an alkenylphenone and a substituted 1-azanaphthalene. The alkenylphenone may have the following structure:

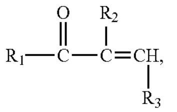

wherein $R_1$ may be an unsubstituted or an inertly substituted aryl having 6 carbon atoms to about carbon atoms, and $R_2$ and $R_3$ may each individually include a hydrogen atom, a halogen, or an inertly substituted aliphatic of about 3 carbon atoms to about 12 carbon atoms, an unsubstituted or an inertly substituted aryl having 6 carbon atoms to about 10 carbon atoms, provided that the total number of carbon atoms in said alkenylphenone does not exceed 16. $R_2$ and $R_3$ may be the same as one another or may be different than one another. The substituted 1-azanaphtalene may have the following structure:

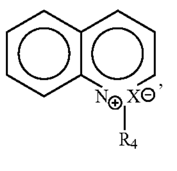

wherein $R_4$ is an unsubstituted or an inertly substituted alkyl having 4 carbon atoms to 16 carbon atoms, or an unsubstituted or inertly substituted alkylaryl having 7 carbon atoms to 20 carbon atoms, and X is a halide.

In certain embodiments, the acidic solution (e.g., the spearhead fluid) may include up to 35% hydrochloric acid (HCl) and have a downhole temperature up to 250 degrees Fahrenheit (° F.). In some embodiments, for example, the acid solution may include up to 15% HCl, up to 7.5% HCl, or any other suitable percentage of HCl.

In certain embodiments, the acidic solution includes up to 3% corrosion inhibitor, up to 1.5% corrosion inhibitor, or up to 1% corrosion inhibitor.

In certain embodiments, the corrosion inhibitor may include other surfactants to increase efficiency or add stability to the formulation. For example, such surfactants that can include quaternary ammonium salts, such as cetyl trimethyl ammonium bromide (CTAB).

FIG. 1 is a representation of a wellbore system 100 including a wellbore 102 extending through an earth formation 103, according to at least one embodiment of the present disclosure. The wellbore 102 may include a vertical portion 104 and a horizontally-extending or deviated portion 106. The wellbore 102 may have been previously formed by one or more drilling operations, followed by casing the wellbore 102 with casing 108. In some embodiments, the casing 108 or at least a portion of the casing 108 may be cemented with cement 110.

The wellbore 102 may include one or more sections including one or more perforations 118. The perforations 118 may be formed through the casing 108, the cement 110 (if present), and at least a portion of the earth formation 103. The perforations 118 may be formed with a perforating gun configured to fire shaped charges into the casing 108 at desired location to penetrate the casing 108, the surrounding cement 110, and portions of the earth formation 103 surrounding the perforating gun. In some embodiments, the wellbore 102 and the earth formation 103 may be perforated in stages (sections) to form the perforations 118. In some embodiments, after perforating a section of the wellbore 102 and earth formation 103, a frac plug configured to block the flow of fracturing fluids of the next stage so that the fracturing fluids are forced through the perforations 118 may be placed in the wellbore 102. In other words, the frac plug may be placed, sized, and shaped to seal lower portions of the wellbore 102 during future fracturing operations.

At a surface 130, the wellbore 102 may be capped by a fluid flow control system 135, such as a so-called "Christmas tree" or a "frac tree." The fluid flow control system 135 may include flow control valves (e.g., master valves, wing valves, swab valves, etc.), spools, flow crosses (e.g., goat heads, frac heads, etc.), and fittings individually and/or collectively configured to direct and control (e.g., permit and prevent) flow of the treatment fluid into the wellbore 102 and to direct and control flow of formation fluids out of the wellbore 102. For example, the fluid flow control system 135 may include at least a first flow control device 134 and a second flow control device 136. The first flow control device 134 and the second flow control device 136 may individually include a valve. The first flow control device 134 and the second flow control device 136 may be configured to close selected tubulars or pipes, such as the casing 108 or production tubing extending within the wellbore 102, to selectively facilitate the flow of various fluids to or from the wellbore 102. In some embodiments, the fluid flow control system 135 includes a blow-out preventer (BOP) stack configured to selectively prevent the flow of formation fluids out of the wellbore 102. The fluid flow control system 135 may be directly or indirectly coupled to the top of a wellhead 138 (e.g., tubing head adapter) terminating the wellbore 102 at the surface 130.

In some embodiments, the first flow control device 134 is operably coupled to and in fluid communication with a first fluid conduit 140 to facilitate selective fluid connection between a first fluid and the wellbore 102. For example, the first flow control device 134 may be in fluid communication with the first fluid conduit 140 via a first valve 141. In some embodiments, the first flow control device 134 is configured to be in fluid communication with one or more of a pump-down fluid, an acid (e.g., a spearhead treatment), a stimulation fluid, a completion fluid, a fracturing fluid, a corrosion inhibitor composition, another fluid to be provided to the wellbore 102, or combinations thereof. In some embodiments, the first fluid includes a fracturing fluid and a corrosion inhibitor composition. As described herein, the fracturing fluid may include a proppant (e.g., fracturing sand) that has been treated with a treatment fluid including a corrosion inhibitor.

The second flow control device 136 may be operably coupled to and in fluid communication with second fluid conduit 142 to facilitate selective fluid connection between a second fluid and the wellbore 102. For example, the second flow control device 136 may be in fluid communication with the second fluid conduit 142 via a second valve 143. The second fluid may include, for example, one or more of a pumpdown fluid, an acid, a stimulation fluid, a completion fluid, a fracturing fluid, a corrosion inhibitor composition, another fluid to be provided to the wellbore 102, or combinations thereof.

The first flow control device 134 and the first fluid conduit 140 may be in fluid communication with a first pump 144; and the second flow control device 136 and the second fluid conduit 142 may be in fluid communication with a second pump 146. The first pump 144 and the second pump 146 may be configured to provide a flow of a desired fluid to the wellbore 102.

In some embodiments, the fluid flow control system 135 includes an access valve 148 to facilitate vertical access to the wellbore 102 by, for example, a bottomhole assembly or a tool string, which may be conveyed through the wellbore 102 via a wireline 112.

In some embodiments, after forming the perforations 118 in the casing 108, the cement 110, and the earth formation 103, the perforations 118 may be exposed to an acid solution to clean (e.g., remove) cement residues from the perforations 118. The acid solution may be provided to the wellbore 102 through, for example, the first fluid conduit 140 or the second fluid conduit 142, through the wellhead 138 and to the wellbore 102.

In some embodiments, after forming the perforations 118 and performing the acid treatment, a hydraulic fracturing fluid (also simply referred to herein as a "fracturing fluid") may be provided to the wellbore 102 to open the perforations 118 and form fractures within the earth formation 103. The fracturing fluid may be provided to the wellbore 102 through the wellhead 138 via, for example, one of the first fluid conduit 140 or the second fluid conduit 142.

The fracturing fluid may be provided at a sufficient pressure to initiate fractures within the earth formation 103. The fracturing fluid may include water, one or more proppants, and one or more chemical additives. For example, the fracturing fluid may include proppants such as solid particles including sand, sintered bauxite, ceramic materials, resin-coated sand, or other particles sized, shaped, and configured to enter the fractures and maintain an open position of the fractures after the earth formation 103 and fractures are no longer exposed to the high pressures of the fracturing fluid. The solid particles may be sized and shaped to facilitate maintaining the openings in the fractures after the fracturing fluid is no longer circulated to the wellbore 102. In some embodiments, during the course of a fracturing process, the size of the proppant may gradually be increased to facilitate opening larger fractures as the fracturing process progresses.

In some embodiments, the proppants include sand. In some embodiments, the sand may have been mined from a location proximate the wellbore 102. As described herein, the sand may have been treated with a treatment fluid including a material formulated and configured to remove calcareous materials and other minerals from the sand. The treatment fluid may further include a corrosion inhibitor formulated and configured to reduce (e.g., prevent) corrosion of mining equipment, sand processing equipment, and/or sand transportation equipment. As illustrated, FIG. 1 shows an impactor 150, a hopper 152, a hydrolyzer 154, a hydrosizer 156, a scrubber 158, a screener 160, a dryer 162, and a storage 164, as discussed in further detail below with respect to the processes shown in FIGS. 2, 5, and 6.

The chemical additives that may be present in the fracturing fluid may include friction reducers, biocides (such as chlorine-based biocides (e.g., sodium hypochlorite (bleach), chlorine dioxide)), scale inhibitors, clay stabilizers, iron control agents, gelling agents, crosslinkers, breaker fluids, pH adjusters, and foaming agents. In some embodiments, the chemical additives constitute from about 0.5 weight percent to about 98.0 weight percent of the fracturing fluid. However, the disclosure is not so limited, and the chemical additives may constitute a different weight percent of the fracturing fluid.

The proppant may constitute from about 0.5 weight percent to about 10.0 weight percent of the fracturing fluid, such as from about 0.5 weight percent to about 1.0 weight percent, from about 1.0 weight percent to about 2.0 weight percent, from about 2.0 weight percent to about 4.0 weight percent, from about 4.0 weight percent to about 6.0 weight percent, from about 6.0 weight percent to about 8.0 weight percent, or from about 8.0 weight percent to about 10.0 weight percent of the fracturing fluid. However, the disclosure is not so limited, and the proppant may constitute a different amount of the fracturing fluid. In some embodiments, during the fracturing operation, a concentration of the proppant may be increased. For example, a concentration of the proppant in the fracturing fluid may increase as the fracturing operation progresses.

After the hydraulic fracturing process is complete, the pressure of the hydraulic fracturing fluid may be reduced. At least a portion of the proppants (e.g., sand) may remain in the fractures and prop the fractures open to facilitate an increase in permeability of the earth formation 103. For example, the sand may remain in the fractures, allowing the oil and gas to move towards the wellbore 102 after the pressure of the fracturing fluid is released. The increased permeability increases the production rates and overall yield from the hydrocarbon reservoir.

Figure 2:
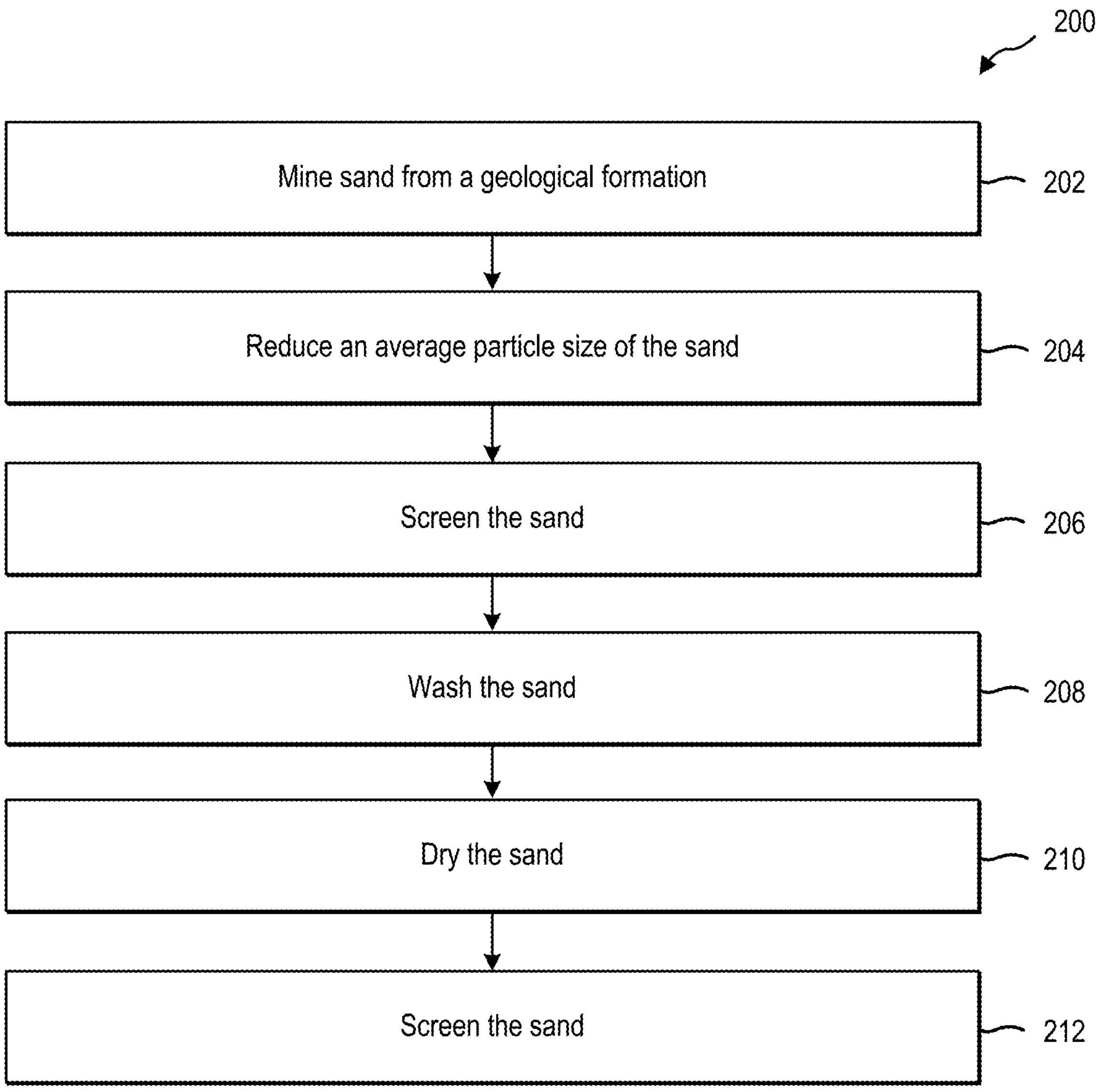
FIG. 2 is a simplified flow diagram illustrating a method of mining and treating a hydraulic fracturing sand, according to at least one embodiment of the present disclosure.

As described above, in some embodiments, the sand is mined and processed at a location proximate the wellbore 102. FIG. 2 is a simplified flow diagram illustrating a method 200 of mining and treating a hydraulic fracturing sand, according to at least one embodiment of the present disclosure. As described herein, the method 200 includes treating the hydraulic fracturing sand with a treatment fluid including one or more materials formulated and configured to remove calcareous and other materials from the sand. The treatment fluid may further include a corrosion inhibitor composition to reduce (e.g., prevent, substantially prevent) corrosion of one or more sand processing equipment.

The method 200 includes mining sand from a geological formation, as shown in act 202. Mining sand from a geological formation may include performing open-pit mining and/or underground mining to remove sand from a geological formation including the sand. The sand may be present in sandstone or one or more other sedimentary rocks or materials. For example, the sand may be dispersed as grains cemented together by silica, lime, calcium carbonate (e.g., limestone) and other minerals in sandstone or other sedimentary rocks. In some embodiments, one or more layers of topsoil are removed to expose one or more underlying layers of sandstone and/or sand. In some embodiments, one or more boreholes may be drilled into the underlying layers of sandstone and/or sand, followed by blasting the sandstone and/or sand to loosen the sandstone and/or sand. In some embodiments, act 202 includes excavating that sand and loading the sand into a truck or other means for transporting the sand.

The mined sand may include silica (quartz), clay, shale, lime, calcium carbonate (e.g., limestone), and one or more additional minerals and/or impurities. Responsive to mining the sand, the method 200 further includes reducing an average particle size of the sand, as shown in act 204. Reducing the average particle size of the sand may include providing the sand to the impactor 150 (also referred to as an "impact crusher"). In some embodiments, the sand is provided to the hopper 152 of the impactor 150. The hopper 152 may be configured to feed the sand to other portions of the impactor 150 configured to break up larger agglomerations of the sand without substantially fracturing individual grains of the sand and form a sand material having a smaller average particle size than the mined sand. In some embodiments, reducing the average particle size of the sand includes separating the sand from other components that are mixed with the sand. For example, reducing the average particle size of the sand may include crushing sandstone to loosen (e.g., remove, release) grains of sand from the sandstone and separate grains of the sand from other materials, such as clay, shale, lime, limestone, and other materials. The impactor 150 may include a horizontal shaft impactor (HSI) or a vertical shaft impactor (VSI).

Responsive to reducing the average particle size of the sand, the method 200 may further include screening the sand leaving the impactor 150 to separate the sand from rocks and other larger pieces, as shown in act 206. In some embodiments, the sand from the impactor 150 is provided to a conveyor which is in operable communication with one or more screens. The sand is provided to the screens having openings sized and configured to allow sand having a size smaller than a predetermined size to pass through. Larger materials, such as rocks, may not pass through the openings in the screen.

With continued reference to FIG. 2, the method 200 may further washing the sand (the screened sand), as shown in act 208. Washing the sand may include adding water to the sand to form a slurry, pumping the slurry to a wet plant, and processing the slurry including the sand at the wet plant. Processing the slurry at the wet plant may include providing the slurry to the hydrosizer 156 configured to separate the sand based on density, size, and/or shape. The slurry may be provided to the hydrosizer 156, such as to a top of the hydrosizer 156. A fluid (e.g., water) is injected near the center and/or bottom of the hydrosizer 156 to create an upward-rising current and suspend relatively lighter solids (sands) in the upward-rising current to separate the relatively lighter solids from heavier solids (sands). The heavier sands may include sands that are suitable for hydraulic fracturing and may exit the bottom of the hydrosizer 156. The lighter materials may include unusable sands, fines, or other materials that are not suitable for use as hydraulic fracturing sand.

The heavier sands may be provided to the scrubber 158 configured to continue washing the heavier sands. The scrubber 158 may facilitate separation of water-soluble clays, dirt, shale, and undesired materials coating the heavier sands. Dirty water including sand that is unusable for hydraulic fracturing is provided to a settling tank where the sand is separated from the water. In some embodiments, the heavier sands are rinsed with water or another fluid one or more additional times to further clean the sand and form a clean hydraulic fracturing sand.

In some embodiments, washing the sand includes washing the sand with a treatment fluid formulated and configured to remove (e.g., dissolve, leach) calcareous materials from the sand. In some embodiments, the treatment fluid is formulated and configured to dissolve calcium carbonate and/or additional calcareous materials from the sand. The mined sand may include a coating of calcareous materials and/or may be mixed with calcareous materials. Sand including calcareous materials may not be suitable for use in a hydraulic fracturing fluid because the calcium carbonate and other calcareous materials may cause scaling in the wellbore, on wellbore equipment, in fractures of the earth formation, and/or in perforations 118. For example, the calcareous material may dissolve in the hydraulic fracturing fluid and/or responsive to exposure to one or more wellbore fluids and subsequently precipitate, leading to scaling. However, the scale may foul wellbore and the wellbore equipment, reducing the operating lifetime of the wellbore and wellbore equipment. In addition, the scale may plug perforations 118 and/or fractures of the earth formation 103, reducing the permeability and conductivity of the earth formation 103. Accordingly, the calcareous materials may be determinantal to hydrocarbon recovery through the fractures.

In some embodiments, the treatment fluid is formulated and configured to remove calcareous and other detrimental materials from the sand. In some embodiments, washing the sand includes exposing the sand to the treatment fluid to remove the calcareous materials from the sand. Washing the sand may include contacting the sand with an aqueous solution including water, one or more materials formulated and configured to remove the calcareous materials from the sand, and a corrosion inhibitor composition. In some embodiments, washing the sand includes forming a slurry including the sand and the aqueous treatment solution. In some such embodiments, the treatment fluid may be provided to the hydrolyzer 154 to facilitate washing the sand in the hydrolyzer 154.

In some embodiments, washing the sand includes adding water to the sand to form a slurry, separating smaller sands from the slurry (such as with the hydrolyzer 154), providing the heavier sands to the scrubber 158, and contacting the heavier sands with the treatment fluid in the scrubber 158. Accordingly, the sand may be contacted by the treatment fluid in the hydrolyzer 154, in the scrubber 158, or both. Of course, the sand may be contacted by the treatment fluid during other portions of the method 200.

As described above, the treatment fluid may include an aqueous solution including water, one or more materials formulated and configured to remove the calcareous materials from the sand, and a corrosion inhibitor composition. The one or more materials formulated and configured to remove the calcareous materials from the sand may include, for example, an acid. The acid may include one or more of hydrochloric acid, sulfuric acid, nitric acid, acetic acid, citric acid, or another acid. In some embodiments, the acid includes hydrochloric acid.

A concentration of the acid (e.g., hydrochloric acid) in the treatment fluid may be within a range of from about 5.0 weight percent to about 30.0 weight percent, such as from about 5.0 weight percent to about 10.0 weight percent, from about 10.0 weight percent to about 15.0 weight percent, from about 15.0 weight percent to about 20.0 weight percent, from about 20.0 weight percent to about 25.0 weight percent, or from about 25.0 weight percent to about 30.0 weight percent. In some embodiments, the concentration of the acid in the treatment fluid is at least about 10.0 weight percent, such as at least about 15.0 weight percent, at least about 20.0 weight percent, at least about 25.0 weight percent, or even at least about 28.0 weight percent. However, the disclosure is not so limited, and the concentration of the acid may be different than that described.

The treatment fluid may include a corrosion inhibitor composition formulated and configured to reduce an amount of corrosion of the sand processing equipment, such as the hydrosizer 156, the scrubber 158, piping, or other process equipment. The corrosion inhibitor composition may be formulated and configured to reduce and/or prevent corrosion of one or more metals including one or more of zinc, nickel, copper, chromium, aluminum, iron, steel, alloys thereof, or combinations thereof. For example, the corrosion inhibitor composition may facilitate exposing the sand to an acid to remove the calcareous materials from the sand while processing the sand in the processing equipment. In some embodiments, the corrosion inhibitor composition reduces and/or prevents the corrosion of iron (e.g., steel, stainless steel, other iron-containing metals) or other metals that may be present in the sand processing equipment. The composition of the corrosion inhibitor composition is described in additional detail herein.

With continued reference to FIG. 2, responsive to washing the sand, the method 200 further includes drying the sand, as shown in act 210. In some embodiments, the washed sand is transported (e.g., conveyed, trucked) to a pile where the washed sand air dries to at least partially dry the sand. In some embodiments, the washed sand is provided from the scrubber 158 to a conveyor and provided to an outdoor pile (mound) where the washed sand is allowed to air dry. The sand may at least partially dry for a duration depending on, for example, the atmospheric conditions (e.g., temperature, humidity) proximate of the pile.

In some embodiments, the at least partially dried sand is provided to the dryer 162 or another device to substantially completely dry the sand. In some embodiments, the sand is transported (e.g., trucked, conveyed, etc.) from the pile to the dryer 162, such as to an inlet hopper of the dryer 162. Hot air may be forced through the dryer 162 to contact the sand and substantially completely remove moisture from the sand to substantially completely dry the sand.

With continued reference to FIG. 2, responsive to drying the sand, method 200 further includes screening the sand, as shown in act 212. In some embodiments, the dried sand is provided to a hopper of the screener 160, such as a reciprocating screener. The screener 160 may be configured to vibrate, reciprocate, rotate, or otherwise facilitate separation of the sand into desired particle sizes. After screening the sand, the sand may be provided to the storage 164, such as to a silo. The sand may be transported (e.g., trucked, railed, or otherwise provided) to a wellsite for use in a hydraulic fracturing fluid. In some embodiments, the screened sand has a substantially spherical shape.

In some embodiments, the screened sand may be further processed to, for example, provide a resin coating on surfaces of the sand.

In some embodiments, the screened sand includes silica or quartz. The sand may have an average particle size within a range of from about 0.1 mm to about 2 mm, such as from about 0.1 mm to about 0.2 mm, from about 0.2 mm to about 0.4 mm, from about 0.4 mm to about 0.7 mm, from about 0.7 mm to about 1.0 mm, from about 1.0 mm to about 1.5 mm, or from about 1.5 mm to about 2.0 mm. However, the disclosure is not so limited, and the screened sand may have a different average particle size than that described.

While the method 200 has been described as including contacting the sand with a treatment fluid including the corrosion inhibitor composition during act 208, the disclosure is not so limited. In some embodiments, calcareous materials may be removed from the sand during other acts of the method 200. In some embodiments, the sand is contacted with the treatment fluid during act 210, such as while the sand is piled. In some embodiments, the treatment fluid may be sprayed onto the sand.

As described above, the corrosion inhibitor composition may be formulated and configured to protect the sand processing equipment, piping, and other components of the sand processing facility from corrosion. For example, the corrosion inhibitor composition may be formulated and configured to reduce and/or prevent corrosion of one or more of piping, conveyor equipment, screens, the hydrosizer 156, the scrubber 158, pumps, or other processing equipment.

A concentration of the corrosion inhibitor composition in the treatment fluid may be within a range of from about 0.5 weight percent to about 5.0 weight percent, such as from about 0.5 weight percent to about 1.0 weight percent, from about 1.0 weight percent to about 2.0 weight percent, from about 2.0 weight percent to about 3.0 weight percent, from about 3.0 weight percent to about 4.0 weight percent, or from about 4.0 weight percent to about 5.0 weight percent of the fluid. In some embodiments, the corrosion inhibitor composition constitutes from about 1.0 weight percent to about 3.0 weight percent of the treatment fluid, such as about 1.5 weight percent of the fluid. In some embodiments, the treatment fluid may include from about 1.0 part by weight to about 5.0 parts by weight of the acid for every about 1.0 part by weight of the corrosion inhibitor composition, such as from about 1.0 part by weight to about 2.0 parts by weight, from about 2.0 parts by weight to about 3.0 parts by weight, from about 3.0 parts by weight to about 4.0 parts by weight, or from about 4.0 parts by weight to about 5.0 parts by weight of the acid for every about 1.0 part by weight of the corrosion inhibitor composition.

The corrosion inhibitor composition may include an alkenylphenone corrosion inhibitor and a substituted 1-azanaphtalene (an N-substituted quinoline) corrosion inhibitor. The corrosion inhibitor composition may further include a carrier fluid (e.g., water), one or more surfactants, and one or more additional additives.

Figure 3:
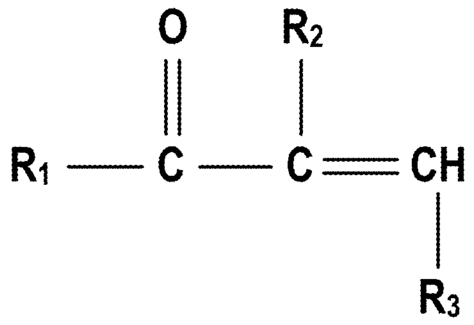
FIG. 3 is a schematic of a structure of an alkenylphenone of a corrosion inhibitor composition, according to at least one embodiment of the disclosure.

The alkenylphenone corrosion inhibitor may have the general structure shown in structure (I) below and illustrated in FIG. 3, (I)

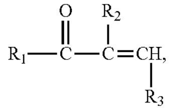

wherein $R_1$ is an unsubstituted or inertly substituted aryl having 6 carbon atoms to 10 carbon atoms, and $R_2$ and $R_3$ may each individually include hydrogen, a halogen, or an inertly substituted aliphatic material (e.g., an alkane) having 3 carbon atoms to 12 carbon atoms, an unsubstituted or inertly substituted aryl having 6 carbon atoms to 10 carbon atoms, provided that the total number of carbon atoms in said alkenylphenone does not exceed 16. $R_2$ may be an alkanol, an ether, or an unsubstituted or inertly substituted aryl having 6 carbon atoms to 10 carbon atoms. Inert substitutions for each of $R_1$, $R_2$, and $R_3$ may include $C_1$ to $C_4$ alkyl groups, a halogen or a halogen-containing group, an ether, an alkoxy group, or a nitro group. $R_2$ and $R_3$ may be the same or may be different than one another.

In some embodiments, the corrosion inhibitor composition may be formed from one or more precursors, such as one or more of 5-benzoyl-1,3-dioxane, 2-benzoyl-1,3-dimethoxy-propane, 3-hydroxy-1-phenyl-1-propanone, an alpha-hydroxy vinylidene compound (e.g., 2-benzoyl-3-hydroxy-1-propene), a hydroxyl ketone (e.g., 3-hydroxy-1-phenyl-1-propanone), another precursor, or combinations thereof. For example, one or more of 5-benzoyl-1,3-dioxane, 2-benzoyl-1,3-dimethoxy-propane, or 3-hydroxy-1-phenyl-1-propanone may form the alkenylphenone corrosion inhibitor when exposed to hydrochloric acid at a temperature of about 65° C.

The alkenylphenone corrosion inhibitor may include 2-benzoyl-3-methoxy-1-propene, 2-benzoyl-3-hydroxyl-1-propene, or a combination thereof. In some embodiments, the alkenylphenone corrosion inhibitor includes 2-benzoyl-3-methoxy-1-propene.

The alkenylphenone corrosion inhibitor may constitute from about 5.0 weight percent to about 15.0 weight percent of the corrosion inhibitor composition, such as from about 5.0 weight percent to about 7.5 weight percent, from about 7.5 weight percent to about 10.0 weight percent, from about 10.0 weight percent to about 12.5 weight percent, or from about 12.5 weight percent to about 15.0 weight percent of the corrosion inhibitor composition. In some embodiments, the alkenylphenone corrosion inhibitor constitutes about 7.5 weight percent of the corrosion inhibitor composition. However, the disclosure is not so limited, and the alkenylphenone corrosion inhibitor may constitute a different amount of the corrosion inhibitor composition than that described.

Figure 4:
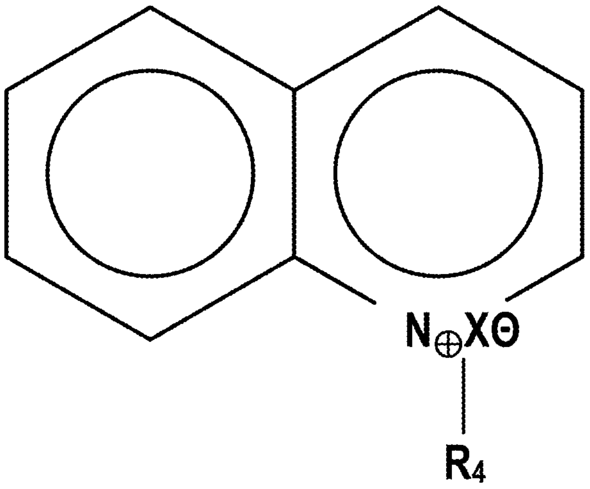
FIG. 4 is a schematic of a structure of a 1-azanaphtalene of the corrosion inhibitor composition, according to at least one embodiment of the disclosure.

The N-substituted quinoline corrosion inhibitor of the corrosion inhibitor composition may include an N-substituted quinoline (e.g., a substituted 1-azanaphtalene). The N-substituted quinoline may be in the form of a salt, such as a quinolinium salt having the general structure shown in structure (II) below and illustrated in FIG. 4, (II)

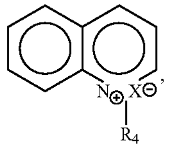

wherein $R_4$ is an unsubstituted or an inertly substituted alkyl having 4 carbon atoms to 16 carbon atoms, or an unsubstituted or inertly substituted alkylaryl having 7 carbon atoms to 20 carbon atoms. Inert substituents may not have an adverse effect on the corrosion inhibition properties of the corresponding unsubstituted N-alkyl or N-alkylaryl quinolinium salts. In structure (II), X may be a halide, such as $Cl^-$, $Br^-$. In some embodiments, the quinolinium salt is 1-(α-napthylmethyl)-quinolinium chloride.

In some embodiments, the quinoline is substituted with a similar or larger fused-ring structure, such as isoquinoline (e.g., 2-azanaphthalene), acridine (e.g., 9-azaanthracene), phenanthridine (e.g., 3,4-benzoquinoline), β-naphthoquinoline (e.g., 5,6-benzoquinoline), or α-naphthoquinoline (e.g., 7,8-benzoquinoline).

The alkenylphenone corrosion inhibitor may constitute from about 5.0 weight percent to about 15.0 weight percent of the corrosion inhibitor composition, such as from about 5.0 weight percent to about 7.5 weight percent, from about 7.5 weight percent to about 10.0 weight percent, from about 10.0 weight percent to about 12.5 weight percent, or from about 12.5 weight percent to about 15.0 weight percent of the corrosion inhibitor composition. In some embodiments, the alkenylphenone corrosion inhibitor constitutes about 7.5 weight percent of the corrosion inhibitor composition.

The N-substituted quinoline corrosion inhibitor may constitute from about 15.0 weight percent to about 35.0 weight percent of the corrosion inhibitor composition, such as from about 15.0 weight percent to about 20.0 weight percent, from about 20.0 weight percent to about 25.0 weight percent, from about 25.0 weight percent to about 30.0 weight percent, or from about 30.0 weight percent to about 35.0 weight percent of the corrosion inhibitor composition. In some embodiments, the N-substituted quinoline corrosion inhibitor constitutes from about 20.0 weight percent to about 25.0 weight percent of the corrosion inhibitor composition. In some embodiments, the N-substituted quinoline corrosion inhibitor constitutes greater than about 20.0 weight percent of the corrosion inhibitor composition. However, the disclosure is not so limited, and the N-substituted quinoline corrosion inhibitor may constitute a different amount of the corrosion inhibitor composition than that described.

A ratio by weight of the N-substituted quinoline corrosion inhibitor to the alkenylphenone corrosion inhibitor in the corrosion inhibitor composition may be within a range of from about 2.0:1.0 to about 5.0:1.0, such as from about 2.0:1.0 to about 2.5:1.0, from about 2.5:1.0 to about 3.0:1.0, from about 3.0:1.0 to about 3.5:1.0, from about 3.5:1.0 to about 4.0:1.0, from about 4.0:1.0 to about 4.5:1.0, or from about 4.5:1.0 to about 5.0:1.0. In some embodiments, the ratio by weight of the N-substituted quinoline corrosion inhibitor to the alkenylphenone corrosion inhibitor is between about 3.0:1.0 to about 3.5:1.0. In other words, for every about 1.0 part by weight of the N alkenylphenone corrosion inhibitor, the corrosion inhibitor composition includes between about 3.0 parts by weight and about 3.5 parts by weight of the substituted quinoline corrosion inhibitor.

The corrosion inhibitor composition may include one or more surfactants. The one or more surfactants may include one or more quaternary ammonium salts (e.g., cetyl trimethyl ammonium bromide; also referred to as cetrimonium bromide (CTAB), alkyl pyridinium chlorides, aryl pyridinium chlorides, alkyl pyridinium bromides, aryl pyridinium bromides, quinolinium quaternary ammonium salts, imidazoline quaternary ammonium salts), an ethoxylated adduct of trimethyl-1-heptanol, ethoxylated tridecyl alcohol, dodecylpyridinium bromide (DDPB), methylnaphtylisopropyl ether (1-isopropoxymethylnapthalene), 1,3-dimethoxy-2-benzoylpropane, 1-chloromethyl naphthalene, 3-hydroxy-1-phenyl-1-propanone, another surfactant, or combinations thereof.

When present in the corrosion inhibitor composition, the quinoline may constitute from about 1.0 weight percent to about 3.0 weight percent of the corrosion inhibitor composition, such as from about 1.0 weight percent to about 1.5 weight percent, from about 1.5 weight percent to about 2.0 weight percent, from about 2.0 weight percent to about 2.5 weight percent, or from about 2.5 weight percent to about 3.0 weight percent of the corrosion inhibitor composition. In some embodiments, quinoline constitutes from about 1.5 weight percent to about 2.0 weight percent of the corrosion inhibitor composition. However, the disclosure is not so limited, and quinoline may constitute a different amount of the corrosion inhibitor composition than that described.

Figure 5:
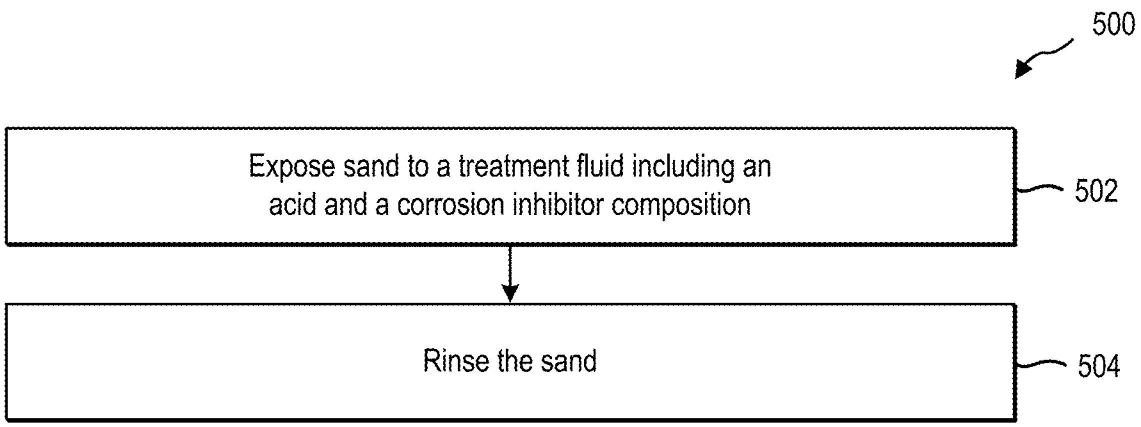
FIG. 5 is a simplified flow diagram illustrating a method of removing a calcareous material from sand, according to at least one embodiment of the present disclosure.

FIG. 5 is a simplified flow diagram illustrating a method 500 of removing a calcareous material from sand, according to at least one embodiment of the present disclosure. The method 500 includes exposing sand to a treatment fluid including an acid and a corrosion inhibitor composition, as shown in act 502. The treatment fluid may include one or more of the treatment fluids described above. For example, the treatment fluid may include an aqueous solution including an acid (e.g., hydrochloric acid). The corrosion inhibitor composition may include the corrosion inhibitor composition described above. For example, the corrosion inhibitor composition may include at least am alkenylphenone, and a substituted 1-azanapthalene.

Exposing the sand to the treatment fluid may substantially remove calcareous materials from the sand. For example, the acid may dissolve the calcareous materials from the sand. In some embodiments, the sand is exposed to the treatment fluid in processing equipment and/or when the sand is in contract with a metal. The corrosion inhibitor composition may reduce and/or prevent corrosion of the metal.

The method 500 may further include rinsing the sand, as shown in act 504. Rinsing the sand may include exposing the sand to an aqueous solution or water. In some embodiments, the sand is rinsed with water to remove the treatment fluid from the sand.

Figure 6:
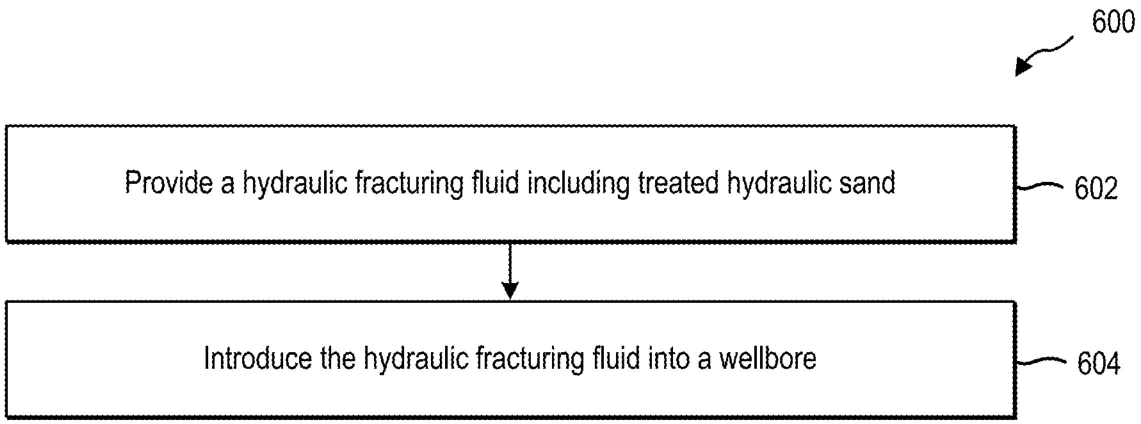
FIG. 6 is a simplified flow diagram illustrating a method of hydraulically fracturing an earth formation using a hydraulic fracturing fluid including a treated hydraulic fracturing sand, according to at least one embodiment of the disclosure.

FIG. 6 is a simplified flow diagram illustrating a method 600 of hydraulically fracturing an earth formation using a hydraulic fracturing fluid including a treated hydraulic fracturing sand, according to at least one embodiment of the disclosure. The method 600 includes providing a hydraulic fracturing fluid including treated hydraulic fracturing sand, as shown in act 602. The hydraulic fracturing fluid may include one or more of the hydraulic fracturing fluids described above and may include, for example, water, the treated hydraulic fracturing sand, and one or more chemical additives. In some embodiments, the hydraulic fracturing fluid further includes one or more proppants in addition to the treated hydraulic fracturing sand.

The treated hydraulic fracturing sand may have been previously treated with one or more of the treatment fluids described above with reference to the method 200 (FIG. 2). In some embodiments, the treated hydraulic fracturing sand may be located in geological formations and may have been mined at a location proximate the wellbore system 100, such as within a distance less than about 100 kilometers (km), less than about 80 km, less than about 60 km, less than about 50 km, less than about 40 km, less than about 20 km, or even less than about 10 km.

The method 600 may further include introducing the hydraulic fracturing fluid into a wellbore, as shown in act 604. Introducing the hydraulic fracturing fluid into the wellbore includes pumping the fracturing fluid into the wellbore and through perforations in a casing, cement, and perforations in the earth formation (e.g., perforations 118 in the casing 108, the cement 110, and the earth formation 103). The hydraulic fracturing fluid may be provided from a surface (e.g., through a fluid conduit) to the wellbore. In some embodiments, the hydraulic fracturing fluid is provided at a sufficient pressure to induce fractures in the earth formation to increase a permeability of the earth formation.

In some embodiments, the composition of the hydraulic fracturing fluid may be changed during a fracturing process. For example, a concentration of the treated hydraulic fracturing sand may be changed (e.g., increased) over the course of the hydraulic fracturing process. In some embodiments, and as described herein, in some embodiments, the hydraulic fracturing fluid further includes a corrosion inhibitor composition, such as one or more of the corrosion inhibitor compositions described above. For example, the corrosion inhibitor composition may include one or more alkenylphenone corrosion inhibitor and one or more N-substituted quinoline corrosion inhibitor, as described above.

Providing the hydraulic fracturing fluid including the treated hydraulic fracturing sand may facilitate reducing transportation costs associated with delivery of the hydraulic fracturing sand to the wellbore system 100. In some embodiments, the treatment fluid facilitates the removal of calcareous and other deleterious materials from the sand during processing of the sand to form the treated hydraulic fracturing sand. The corrosion inhibitor composition in the treatment fluid facilitates preparing the treated hydraulic fracturing sand during processing of the sand at a location proximate the wellbore system 100 without damaging (e.g., corroding) processing equipment used during production of the treated hydraulic fracturing sand.

Although certain embodiments of the present disclosure are described with respect to inhibiting or minimizing corrosion to processing equipment while removing calcareous materials from sand, it should be understood that such an application is merely exemplary and non-limiting. In some embodiments, the corrosion inhibitor composition may reduce and/or prevent corrosion of wellbore equipment and/or the wellbore during hydraulic fracturing operations. In some embodiments, the corrosion inhibitor composition may reduce scaling caused by hydraulic fracturing sand during hydraulic fracturing. For example, the corrosion inhibitor composition may reduce and/or prevent deposition of scale in fractures of the earth formation 103.

Without being bound by any particular theory, it is believed that the corrosion inhibitors of the corrosion inhibitor composition (e.g., the alkenylphenone and the substituted 1-azanapthalene) form a protective film on surfaces of materials (e.g., metals) which are contacted by the corrosion inhibitor composition. The protective film of the corrosion inhibitor composition reduces and/or prevents corrosive attack of the components which are covered or protected by the protective film.

Accordingly, the corrosion inhibitor composition may protect one or more wellbore components, sand mining and processing equipment, surface equipment, and/or surface lines from corrosion. The corrosion inhibitor composition may reduce and/or prevent one or more of chemical corrosion caused by acids; electrochemical corrosion caused by formation water, formation brines, or produced water; chlorine-based corrosion, such as corrosion caused by chlorine-based biocides; corrosion caused by hydrogen sulfide; or other types of corrosion.

The embodiments of corrosion inhibitor compositions have been primarily described with reference to sand mining and processing operations; the corrosion inhibitor compositions described herein may be used in applications other mining and processing operations. In addition, the embodiments of hydraulic fracturing including the treated hydraulic fracturing sand have been primarily described with reference to hydraulic fracturing operations for improving the permeability of the earth formation for hydrocarbon recovery; the treated hydraulic fracturing sand described herein may be used in applications other than the hydrocarbon recovery. Accordingly, the terms "wellbore," "borehole," and the like should not be interpreted to limit tools, systems, assemblies, or methods of the present disclosure to any particular industry, field, or environment.

In some embodiments, the treated hydraulic fracturing sand may be used during formation of a wellbore to be used for carbon capture, utilization, and storage (CCUS) and/or for recovery and use of geothermal energy. For example, the treated hydraulic fracturing sand may be used to form wellbores without introducing materials to the earth formation that may impede subsequent storage of carbon in the earth formation.

In other embodiments, completion fluids and injected fluids including the corrosion inhibitor compositions according to the present disclosure may be used outside a wellbore or other downhole environment used for the exploration or production of natural resources. Accordingly, the terms "wellbore," "borehole," and the like should not be interpreted to limit tools, systems, assemblies, or methods of the present disclosure to any particular industry, field, or environment. In addition, the corrosion inhibitor compositions may be used in cased completion wellbores and in open hole completion wellbores.

Geothermal energy is a promising source of renewable energy that captures energy from heat generated within the earth. For example, geothermal energy may be used to heat structures (e.g., buildings) and/or to generate electricity (e.g., by heating water to generate steam and drive a turbine with the steam). The treated hydraulic fracturing sand described herein may be used to form wellbores used to circulate a fluid that is heated within the earth formation through which the wellbore extends. The heated fluid may be circulated to the surface where the captured heat may be recovered to heat a structure and/or generate electricity, followed by recirculation of the fluid to the earth formation to continue the cycle.

CCUS facilitates the capture, use, and/or storage of carbon (e.g., carbon dioxide), which has a goal of achieving carbon neutrality and/or net zero carbon emissions (NZE). CCUS may facilitate the capture of carbon dioxide from large point sources (e.g., power plants, refineries, cement plants, other industrial processing plants, or other industrial facilities that use fossil fuels, biomass fuels, or other fuels that generate carbon dioxide). The captured carbon dioxide may be converted into valuable products such as, for example, ethanol, sustainable aviation fuel, chemicals, and mineral aggregates. Alternatively, the carbon dioxide may be stored in geologic formations, such as in depleted hydrocarbon reservoirs. The carbon dioxide may be introduced into the earth formation through a wellbore formed using the treated hydraulic fracturing sand described herein. In the earth formation, the carbon dioxide may be dispersed in an aqueous phase and stored as carbon dioxide, in mineral form (e.g., as a carbonate, such as calcium carbonate, magnesium carbonate, iron (II) carbonate), or as another form of carbon.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements." As used herein, the terms "up" and "down," "uphole" and "downhole", "upper" and "lower," "top" and "bottom," and other like terms indicating relative positions to a given point or element are utilized to more clearly describe some elements. Commonly, these terms relate to a reference point as the surface from which drilling operations are initiated as being the top (e.g., uphole or upper) point and the total depth along the drilling axis being the lowest (e.g., downhole or lower) point, whether the well (e.g., wellbore, borehole) is vertical, horizontal or slanted relative to the surface.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:

mining sand at a location proximate a wellbore extending into an earth formation;

contacting the sand with an aqueous treatment fluid to remove calcareous materials from the sand and form treated hydraulic fracturing sand, the aqueous treatment fluid including a corrosion inhibitor composition comprising:

an alkenylphenone; and a substituted 1-azanapthalene; and drying the treated hydraulic fracturing sand after contacting the sand with the aqueous treatment fluid.

2. The method of claim 1, further comprising:

preparing a hydraulic fracturing fluid by combining the treated hydraulic fracturing sand with a liquid after drying the treated hydraulic fracturing sand;

supplying the hydraulic fracturing fluid into the wellbore; and hydraulically fracturing the earth formation with the hydraulic fracturing fluid.

3. The method of claim 2, further comprising drying, via a dryer, the treated hydraulic fracturing sand after contacting the sand with the aqueous treatment fluid and before preparing the hydraulic fracturing fluid.

4. The method of claim 1, wherein contacting the sand with the aqueous treatment fluid includes contacting the sand with the aqueous treatment fluid including an acid.

5. The method of claim 1, wherein contacting the sand with the aqueous treatment fluid includes contacting the sand with the aqueous treatment fluid including hydrochloric acid.

6. The method of claim 1, wherein contacting the sand with the aqueous treatment fluid includes contacting the sand with the aqueous treatment fluid including from about 1.0 part by weight to about 5.0 parts by weight of an acid for every about 1.0 part by weight of the corrosion inhibitor composition.

7. The method of claim 1, wherein contacting the sand with the aqueous treatment fluid includes contacting the sand with the aqueous treatment fluid in a hydrosizer, a scrubber, or both.

8. The method of claim 1, wherein mining sand at the location proximate the wellbore extending into the earth formation includes mining the sand at a location less than about 100 kilometers from the wellbore.

9. The method of claim 1, further comprising screening the treated hydraulic fracturing sand after drying the treated hydraulic fracturing sand.

10. The method of claim 1, wherein contacting the sand with the aqueous treatment fluid includes contacting the sand with the aqueous treatment fluid including:

the alkenylphenone having the following structure:

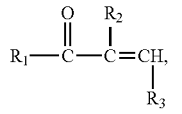

wherein $R_1$ is an unsubstituted or an inertly substituted aryl having 6 carbon atoms to 10 carbon atoms, and $R_2$ and $R_3$ individually include hydrogen, a halogen, or an inertly substituted aliphatic of 3 carbon atoms to 12 carbon atoms, an unsubstituted or an inertly substituted aryl having 6 carbon atoms to 10 carbon atoms; and the substituted 1-azanapthalene having the following structure:

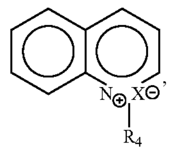

wherein $R_4$ is a substituted alkyl having 4 carbon atoms to 16 carbon atoms, or an unsubstituted or inertly substituted alkylaryl having 7 carbon atoms to 20 carbon atoms, and X is a halide.

11. The method of claim 1, wherein contacting the sand with the aqueous treatment fluid includes contacting the sand with the aqueous treatment fluid including at least about 3.0 parts by weight of the substituted 1-azanapthalene for every about 1.0 part by weight of the alkenylphenone.

12. The method of claim 1, wherein the corrosion inhibitor composition comprises a cetyl trimethyl ammonium bromide.

13. The method of claim 1, wherein the corrosion inhibitor composition comprises from about 2.0 parts by weight to about 5.0 parts by weight of the substituted 1-azanapthalene for every about 1.0 part by weight of the alkenylphenone.

14. A method for inhibiting corrosion of sand processing equipment during processing of hydraulic fracturing sand, the method comprising:

contacting sand including a calcareous material with a treatment fluid to dissolve the calcareous material from the sand, the treatment fluid comprising:

an acid; and a corrosion inhibitor composition comprising:

an alkenylphenone with the structure:

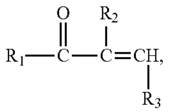

wherein $R_1$ is an unsubstituted or an inertly substituted aryl having 6 carbon atoms to 10 carbon atoms, and $R_2$ and $R_3$ each individually include hydrogen, a halogen, or an inertly substituted aliphatic having 3 carbon atoms to 12 carbon atoms, an unsubstituted or inertly substituted aryl having 6 carbon atoms to 10 carbon atoms, wherein a total number of carbon atoms of the alkenylphenone is less than 16; and a substituted 1-azanaphtalene with the structure:

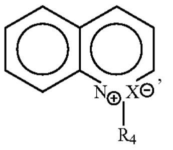

wherein $R_4$ is a substituted alkyl having 4 carbon atoms to 16 carbon atoms, or an unsubstituted or inertly substituted alkylaryl having 7 carbon atoms to 20 carbon atoms, and X is a halide; and drying the sand after contacting the sand with the treatment fluid.

15. The method of claim 14, wherein contacting sand including the calcareous material with the treatment fluid includes contacting the sand with the treatment fluid comprising hydrochloric acid.

16. The method of claim 14, wherein contacting sand including the calcareous material with the treatment fluid includes contacting the sand with the treatment fluid including from about 1.0 part by weight to about 5.0 parts by weight of the acid for every about 1.0 part by weight of the corrosion inhibitor composition.

17. The method of claim 14, wherein the corrosion inhibitor composition comprises 2-benzoyl-3-methoxy-1-propene, 2-benzoyl-3-hydroxyl-1-propene, or a combination thereof.

18. The method of claim 14, wherein contacting sand including the calcareous material with the treatment fluid includes contacting the sand with the treatment fluid in a hydrosizer or a scrubber.

19. The method of claim 14, wherein the corrosion inhibitor composition comprises 1-(α-napthylmethyl)-quinolinium chloride.

20. A method for removing a calcareous material from hydraulic fracturing sand, the method comprising:

mining sand from an earth formation including the sand and a calcareous material; and contacting the sand with a treatment fluid including an acid and a corrosion inhibitor composition, the corrosion inhibitor composition comprising:

an alkenylphenone having the following structure:

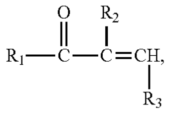

wherein $R_1$ is an unsubstituted or an inertly substituted aryl having 6 carbon atoms to 10 carbon atoms, and $R_2$ and $R_3$ each individually include hydrogen, a halogen, or an inertly substituted aliphatic having 3 carbon atoms to 12 carbon atoms, an unsubstituted or inertly substituted aryl having 6 carbon atoms to 10 carbon atoms, wherein a total number of carbon atoms of the alkenylphenone is less than 16; and a substituted 1-azanaphtalene having the following structure:

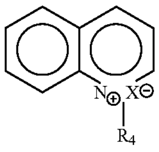

wherein $R_4$ is a substituted alkyl having 4 carbon atoms to 16 carbon atoms, or an unsubstituted or inertly substituted alkylaryl having 7 carbon atoms to 20 carbon atoms, and X is a halide; and a surfactant including a quaternary ammonium salt, wherein the corrosion inhibitor composition includes at least about 3.0 parts by weight of the substituted 1-azanaphtalene for every about 1.0 part by weight of the alkenylphenone; and drying the sand after contacting the sand with the treatment fluid.

* * * * *